United States Patent
Yang et al.

(10) Patent No.: US 12,099,680 B2
(45) Date of Patent: Sep. 24, 2024

(54) TOUCH DISPLAY DEVICE

(71) Applicant: E Ink Holdings Inc., Hsinchu (TW)

(72) Inventors: Ming-Huan Yang, Hsinchu (TW); Wei-Sung Cheng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/359,881

(22) Filed: Jul. 27, 2023

(65) Prior Publication Data
US 2024/0086005 A1    Mar. 14, 2024

(30) Foreign Application Priority Data
Sep. 14, 2022    (TW) ................................. 111134646

(51) Int. Cl.
G06F 3/041    (2006.01)

(52) U.S. Cl.
CPC ............. *G06F 3/04164* (2019.05); *G06F 2203/04102* (2013.01)

(58) Field of Classification Search
CPC .............. G06F 3/04164; G06F 2203/04102
USPC ......................................................... 345/173
See application file for complete search history.

(56) References Cited

U.S. PATENT DOCUMENTS

| | | |
|---|---|---|
| 8,476,828 B2 | 7/2013 | Hayashi et al. |
| 9,214,640 B2 | 12/2015 | Lee et al. |
| 9,287,329 B1 | 3/2016 | Lee et al. |
| 9,379,355 B1 | 6/2016 | Lee |
| 9,490,312 B2 | 11/2016 | Lee et al. |
| 9,647,052 B2 | 5/2017 | Youn et al. |
| 9,736,931 B2 | 8/2017 | Eom et al. |
| 9,780,042 B2 | 10/2017 | Woychik et al. |
| 10,288,973 B1 * | 5/2019 | Gupta ................. G02F 1/167 |
| 2021/0004101 A1 | 1/2021 | Wei et al. |
| 2021/0168231 A1 | 6/2021 | Baker et al. |
| 2021/0208444 A1 * | 7/2021 | Oka ................. G02F 1/1339 |
| 2021/0271298 A1 | 9/2021 | Chen et al. |
| 2024/0057270 A1 * | 2/2024 | Zhang ............... G09G 3/035 |

FOREIGN PATENT DOCUMENTS

| | | | | |
|---|---|---|---|---|
| JP | 2004213413 A | * | 7/2004 | ....... G02F 1/133305 |
| TW | 201740258 | | 11/2017 | |
| TW | 201814464 | | 4/2018 | |
| TW | 201910991 | | 3/2019 | |
| TW | 202105149 | | 2/2021 | |

* cited by examiner

*Primary Examiner* — Mark Edwards
(74) *Attorney, Agent, or Firm* — JCIPRNET

(57) ABSTRACT

A touch display device includes a driving substrate, a display medium layer, a conductive film, a touch panel, a circuit board and a reinforcing structure layer. The driving substrate includes a first portion, a second portion and a bending portion connecting the first portion and the second portion. The display medium layer is disposed on the first portion of the driving structure. The conductive film is disposed on the first portion of the driving structure and located on the display medium layer. The touch panel is disposed on the first portion of the driving substrate and located on the conductive film. The circuit board is disposed on the second portion of the driving substrate. The reinforcing structure layer is disposed on the bending portion of the driving substrate and extends to the first portion to seal the space.

10 Claims, 1 Drawing Sheet

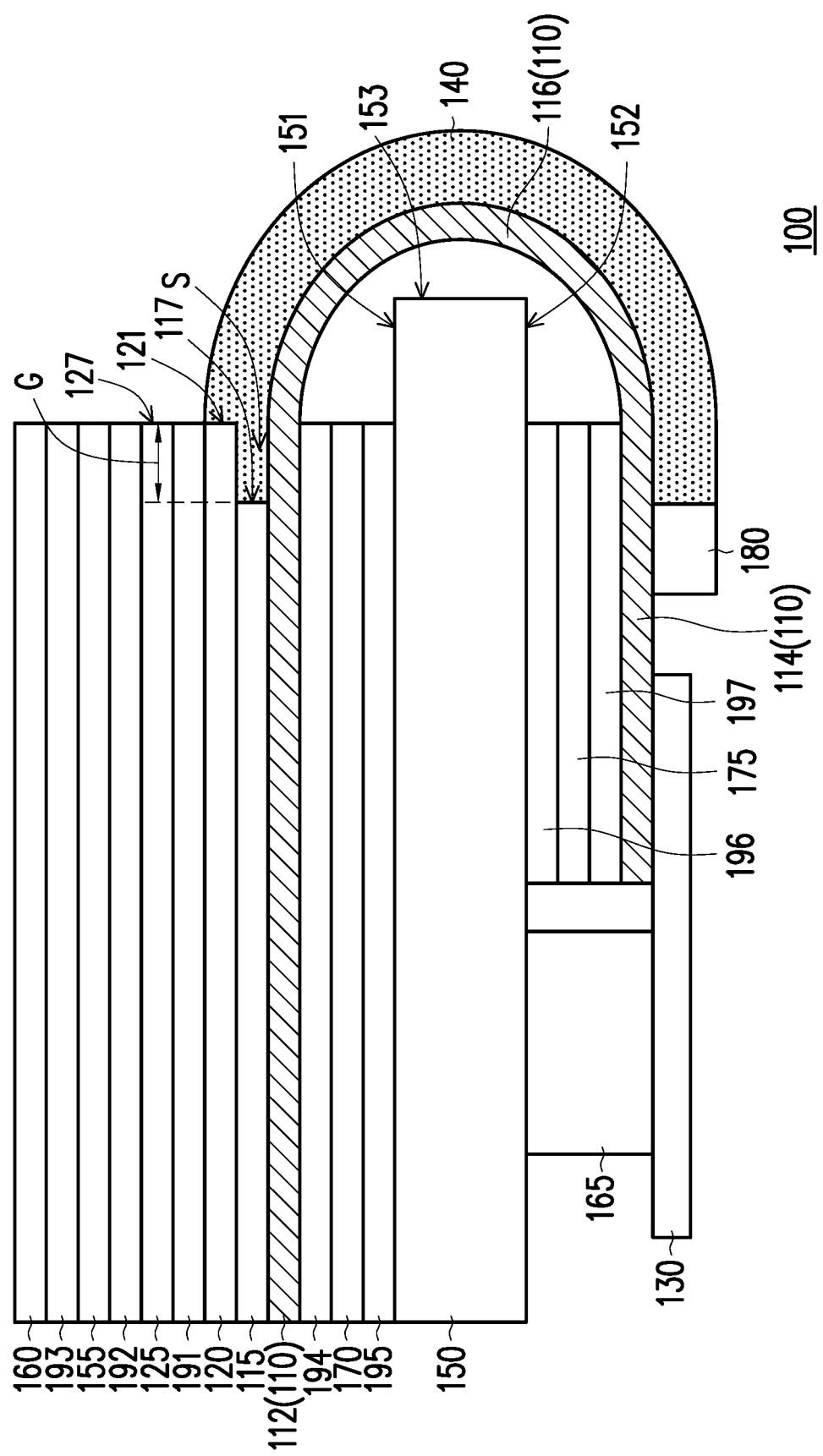

TOUCH DISPLAY DEVICE

CROSS-REFERENCE TO RELATED APPLICATION

This application claims the priority benefit of Taiwan application serial no. 111134646, filed on Sep. 14, 2022. The entirety of the above-mentioned patent application is hereby incorporated by reference herein and made a part of this specification.

BACKGROUND

Technical Field

The present disclosure relates to a display device, and more particularly, to a touch display device.

Description of Related Art

Among the packaging technologies adopted by the current panel driver integrated circuits (ICs), the COP (Chip On Plastic) technology is the design with the slimmest border among all panels at present. In COP technology, an integrated circuit is directly bonded to a panel, and a plastic substrate is adopted to achieve slim/no border with bendable characteristics. Generally speaking, in the structural design, a bending reinforcement material is coated on the bend of the circuit substrate, and a uniform reinforcement material with a suitable thickness is adopted to reduce the stress locally accumulated when the circuit substrate is bent, so as to avoid circuit breakage or bulge. However, the material-heterogeneous interface is normally the starting point that breaks due to application of force. When the applied bending reinforcement material has poor adhesion to the circuit substrate and the sealant, it is likely that the reinforcement material will come off and/or will be fractured during the bending process, and the structural reliability of the product will be reduced.

SUMMARY

The present disclosure provides a touch display device, which has better structural reliability and is able to meet the design requirements of a slim border.

A touch display device of the disclosure includes a driving substrate, a display medium layer, a conductive film, a touch panel, a circuit board and a reinforcing structure layer. The driving substrate includes a first portion, a second portion and a bending portion connecting the first portion and the second portion. The display medium layer is disposed on the first portion of the driving substrate. The conductive film is disposed on the first portion of the driving substrate and located on the display medium layer. The display medium layer is shrunk by a gap relative to one side surface of the touch panel to form a space. The touch panel is disposed on the first portion of the driving substrate and located on the conductive film. The circuit board is disposed on the second portion of the driving substrate. The reinforcing structure layer is disposed on the bending portion of the driving substrate and extends to the first portion to seal the space.

In an embodiment of the present disclosure, the touch display device further includes a support plate having a first surface and a second surface opposite to each other and a lateral surface connecting the first surface and the second surface. The first portion of the driving substrate, the display medium layer, the conductive film and the touch panel are located on the first surface. The second portion of the driving substrate and the circuit board are located on the second surface. The bending portion of the driving substrate and the reinforcing structure layer are located beside the lateral surface.

In an embodiment of the present disclosure, the touch display device further includes a first adhesive layer, a protective layer and a second adhesive layer. The first adhesive layer is disposed between the first surface of the support plate and the first portion of the driving substrate. The first adhesive layer directly contacts the first portion of the driving substrate. The protective layer is disposed on the first adhesive layer. The second adhesive layer is disposed on the protective layer, and the second adhesive layer directly contacts the protective layer and the first surface of the support plate.

In an embodiment of the present disclosure, the touch display device further includes a double-sided adhesive layer, which is directly disposed between the second surface of the support plate and the circuit board.

In an embodiment of the present disclosure, the touch display device further includes a first adhesive layer, a protective layer and a second adhesive layer. The first adhesive layer is disposed between the second surface of the support plate and the second portion of the driving substrate, and the first adhesive layer directly contacts the second surface of the support plate. The protective layer is disposed on the first adhesive layer. The second adhesive layer is disposed on the protective layer, and the second adhesive layer directly contacts the protective layer and the second portion of the driving substrate.

In an embodiment of the present disclosure, the touch display device further includes an adhesive layer disposed between the touch panel and the conductive film.

In an embodiment of the present disclosure, the touch display device further includes a light guide plate and a cover plate. The light guide plate is disposed on the first portion of the driving substrate and located on the touch panel. The cover plate is disposed on the first portion of the driving substrate and located on the light guide plate.

In an embodiment of the present disclosure, the touch display device further includes a first adhesive layer and a second adhesive layer. The first adhesive layer is disposed between the touch panel and the light guide plate. The second adhesive layer is disposed between the light guide plate and the cover plate.

In an embodiment of the present disclosure, the touch display device further includes an integrated circuit configured on the second portion of the driving substrate. The reinforcing structure layer extends to the second portion and is connected to the integrated circuit.

In an embodiment of the present disclosure, the reinforcing structure layer further extends to cover the lateral surface of the conductive film.

Based on the above, in the design of the touch display device of the present disclosure, the reinforcing structure layer is disposed on the bending portion of the driving substrate and extends to the first portion to seal a space formed by the display medium layer by shrinking by a gap relative to one side surface of the touch panel. Therefore, the reinforcing structure layer of the present disclosure not only may be used as a sealing material, so that the sealant in the related art may be omitted, but also may serve as a protective material when the driving substrate is bent, so that it is possible to avoid the problems in the related art concerning the damage of circuit and separation of interface between the adhesive materials (reinforcing material and the sealant) due to stress concentration that is generated when the driving substrate is bent. Therefore, the touch display device of the present disclosure may have better structural reliability. In addition, the arrangement of the driving substrate and the reinforcing structure layer thereon allow the touch display device of the present disclosure to meet the design requirement of slim border.

In order to make the above-mentioned features and advantages of the present disclosure more comprehensible, the following embodiments are given and described in detail with the accompanying drawings as follows.

BRIEF DESCRIPTION OF THE DRAWINGS

The FIGURE is a schematic diagram of a touch display device according to an embodiment of the present disclosure.

DESCRIPTION OF THE EMBODIMENTS

The embodiments of the present disclosure can be understood together with the drawings, and the drawings of the present disclosure are also regarded as a part of the disclosure description. It is to be understood that the drawings of the present disclosure are not to scale and, in fact, the dimensions of elements may be arbitrarily enlarged or reduced in order to clearly represent the features of the present disclosure. Furthermore, references to a first layer being on or over a second layer may include the fact that the first layer is in direct contact with the second layer or the first layer and the second layer may not be in direct contact, i.e., one or more other structural layers may be arranged between the first layer and the second layer. However, if the first layer is directly on the second layer, it means that the first layer is in direct contact with the second layer.

The FIGURE is a schematic diagram of a touch display device according to an embodiment of the present disclosure. Referring to the FIGURE, in this embodiment, the touch display device 100 includes a driving substrate 110, a display medium layer 115, a conductive film 120, a touch panel 125, a circuit board 130, and a reinforcing structure layer 140. The circuit board 130 is embodied as a flexible circuit board in this embodiment, but is not limited thereto. The driving substrate 110 includes a first portion 112, a second portion 114, and a bending portion 116 connecting the first portion 112 and the second portion 114. The display medium layer 115 is disposed on the first portion 112 of the driving substrate 110. The conductive film 120 is disposed on the first portion 112 of the driving substrate 110 and located on the display medium layer 115. The touch panel 125 is disposed on the first portion 112 of the driving substrate 110 and located on the conductive film 115. The display medium layer 115 is shrunk by a gap G relative to one side surface 127 of the touch panel 125 to form a space S. The circuit board 130 is disposed on the second portion 114 of the driving substrate 110. The reinforcing structure layer 140 is disposed on the bending portion 116 of the driving substrate 110 and extends to the first portion 112 to seal the space S. In the FIGURE, the width of the conductive film 120 is larger than that of the display medium layer 115 and the same as the width of the touch panel 125, but the present disclosure is not limited thereto. In an embodiment, the width of the conductive film 120 may also be equal to the width of the display medium layer 115, or, the width of the conductive film 120 may be smaller than the width of the touch panel 125.

In an embodiment, the driving substrate 110 is composed of, for example, a backplane and an active device layer, and the active device layer is disposed on the backplane and located on the first portion 112. That is, the driving substrate 110 may be an active device array substrate, such as a thin film transistor (TFT) array substrate or a thin film diode (TFD) array substrate, but not limited thereto. The back plate is, for example, a flexible substrate, and the material thereof is, for example, plastic, but not limited thereto. The display medium layer 115 is, for example, an electrophoretic display (EPD) film, but not limited thereto. Here, the driving substrate 110, the display medium layer 115 and the conductive film 120 may define a display panel, such as an electrophoretic display panel, and the touch display device 100 may be regarded as a flexible electronic paper touch display device.

In addition to the active device layer, the bending portion 116 of the driving substrate 110 may further have a metal pattern layer (not shown) and an organic dielectric layer (not shown). The size of the display medium layer 115 is smaller than that of the conductive film 120. Therefore, when the conductive film 120 is directly disposed on the display medium layer 115, there will be a horizontal distance, that is, a gap between the side surface 117 of the display medium layer 115 and the side surface 127 of the touch panel 125, thereby forming a concave space S. The reinforcing structure layer 140 is, for example, an adhesive material having a water blocking effect and a suitable Young's coefficient, and is formed on the bending portion 116 of the driving substrate 110 by coating. The material of the reinforcing structure layer 140 is, for example, light-cured or heat-cured acrylic material, polyurethane or epoxy resin, but not limited thereto. As shown in the FIGURE, in addition to being disposed on the bending portion 116 of the driving substrate 110, the reinforcing structure layer 140 of this embodiment also extends above the first portion 112 of the driving substrate 110 to fill and seal the concave space S, and the reinforcing structure layer 140 may also be regarded as a sealing material. Preferably, the reinforcing structure layer 140 further extends to cover the side surface 121 of the conductive film 120. That is to say, the reinforcing structure layer 140 of this embodiment is not only located on and covers the metal pattern layer and the organic dielectric layer on the bending portion 116, but also located at and covers a position between a portion of the active device layer and the conductive films 120 of the first portion 112.

In short, the reinforcing structure layer 140 of this embodiment may be used not only as a sealing material, but also as a protective material when the driving substrate 110 is bent, so that it is possible to avoid the problems concerning the damage of circuit and separation of interface between the adhesive materials due to stress concentration that is generated when the driving substrate is bent. Therefore, the touch display device 100 of this embodiment may have better structural reliability. In addition, the arrangement of the driving substrate 110 and the reinforcing structure layer 140 on the driving substrate 110 allows the touch display device 100 of this embodiment to meet the design requirement of slim border, for example, the border width in the related art may be reduced from 12 mm to 4.3 mm.

Further, please refer to the FIGURE again, the touch display device 100 of this embodiment further includes an adhesive layer 191, and the adhesive layer 191 is disposed between the touch panel 125 and the conductive film 120 for directly adhering and fixing the touch panel 125 and the conductive film 120. Furthermore, the touch display device 100 of this embodiment further includes a light guide plate 155 and a cover plate 160. The light guide plate 155 is disposed on the first portion 112 of the driving substrate 110 and located on the touch panel 125. The cover plate 160 is disposed on the first portion 112 of the driving substrate 110 and located on the light guide plate 155. In addition, the touch display device 100 further includes an adhesive layer 192 (i.e., the first adhesive layer) and an adhesive layer 193 (i.e., the second adhesive layer). The adhesive layer 192 is disposed between the touch panel 125 and the light guide plate 155 for directly adhering and fixing the touch panel 125 and the light guide plate 155. The adhesive layer 193 is disposed between the light guide plate 155 and the cover plate 160 for directly adhering and fixing the light guide plate 155 and the cover plate 160. The positions of the light guide plate 155 and the touch panel 125 may be switched (not shown), that is, the touch panel 125 is placed under the cover plate 160 first, and the adhesive layer 193 is placed between the cover plate 160 and the touch panel 125, and then the light guide plate 155 is disposed between the touch panel 125 and the conductive film 120, and the adhesive layer 192 is disposed between the light guide plate 155 and the touch panel 125.

In order to effectively support the structural layers, the touch display device 100 of this embodiment further includes a support plate 150, and the support plate 150 has a first surface 151 and a second surface 152 opposite to each other and a lateral surface 153 connecting the first surface 151 and the second surface 152. The first portion 112 of the driving substrate 110, the display medium layer 115, the conductive film 120, the touch panel 125, the light guide plate 155 and the cover plate 160 are located on the first surface 151. The second portion 114 of the driving substrate 110 and the circuit board 130 are located on the second surface 152. The bending portion 116 of the driving substrate 110 and the reinforcing structure layer 140 are located beside the lateral surface 153, and the bending portion 116 is located between the lateral surface 153 of the support plate 150 and the reinforcing structure layer 140.

Furthermore, the touch display device 100 of this embodiment further includes an adhesive layer 194 (i.e., a first adhesive layer), a protective layer 170 and an adhesive layer 195 (i.e., a second adhesive layer). The adhesive layer 194 is disposed between the first surface 151 of the support plate 150 and the first portion 112 of the driving substrate 110, and the adhesive layer 194 directly contacts the first portion 112 of the driving substrate 110. The protective layer 170 is disposed on the adhesive layer 194. The adhesive layer 195 is disposed on the protective layer 170, and the adhesive layer 195 directly contacts the protective layer 170 and the first surface 151 of the support plate 150. That is, the display panel is connected to the support plate 150 through the adhesive layer 194 and the adhesive layer 195, and the support plate 150 is able to support the display panel and the touch panel 125, the light guide plate 155 and the cover plate 160 thereon.

Furthermore, the touch display device 100 of this embodiment further includes an adhesive layer 196 (i.e., a first adhesive layer), a protective layer 175 and an adhesive layer 197 (i.e., a second adhesive layer). The adhesive layer 196 is disposed between the second surface 152 of the support plate 150 and the second portion 114 of the driving substrate 110, and the adhesive layer 196 directly contacts the second surface 152 of the support plate 150. The protective layer 175 is disposed on the adhesive layer 196. The adhesive layer 197 is disposed on the protective layer 175, and the adhesive layer 197 directly contacts the protective layer 175 and the second portion 114 of the driving substrate 110. That is, the second portion 114 of the driving substrate 110 is connected to the support plate 150 through the adhesive layer 196 and the adhesive layer 197. Under the circumstances, a portion of the second portion 114 of the driving substrate 110 is located on the circuit board 130.

On the other hand, the touch display device 100 of this embodiment further includes a double-sided adhesive layer 165, and the double-sided adhesive layer 165 is directly disposed between the second surface 152 of the support plate 150 and the circuit board 130 to fix the support board 150 and the circuit board 130 together. Here, the thickness of the double-sided adhesive layer 165 is approximately equal to the sum of the thicknesses of the adhesive layer 196, the protective layer 175, the adhesive layer 197 and the second portion 114 of the driving substrate 110, so the double-sided adhesive layer 165 may also be regarded as a padding layer. In addition, the touch display device 100 of this embodiment further includes an integrated circuit 180, and the integrated circuit 180 is disposed on the second portion 114 of the driving substrate 110, and the reinforcing structure layer 140 extends to a portion of the second portion 114 and is connected to the integrated circuit 180. The reinforcing structure layer 140 may further extend and be connected to the lateral surface of the integrated circuit 180.

In short, in this embodiment, a reinforcing structure layer 140 with a water blocking effect and a suitable Young's coefficient is selected as a protective material for the condition where the driving substrate 110 is bent, and may also be selected as a sealing material for the display panel. Since the reinforcing structure layer 140 extends to the first portion 112 of the driving substrate 110 to seal the concave space S formed by the display medium layer 115 by shrinking relative to the side surface 127 of the touch panel 125, which means that the reinforcing structure layer 140 infiltrates into the display panel, it is possible to avoid the problems in the related art concerning the damage of circuit and separation of interface between the adhesive materials due to stress concentration that is generated when the driving substrate is bent. In this way, the touch display device 100 of this embodiment may have better structural reliability.

To sum up, in the design of the touch display device of the present disclosure, the reinforcing structure layer is disposed on the bending portion of the driving substrate and extends to the first portion to seal a space formed by the display medium layer by shrinking by a gap relative to one side surface of the touch panel. Therefore, the reinforcing structure layer of the present disclosure not only may be used as a sealing material, so that the sealant in the related art may be omitted, but also may serve as a protective material when the driving substrate is bent, so that it is possible to avoid the problems in the related art concerning the damage of circuit and separation of interface between the adhesive materials (reinforcing material and the sealant) due to stress concentration that is generated when the driving substrate is bent. Therefore, the touch display device of the present disclosure may have better structural reliability. In addition, the arrangement of the driving substrate and the reinforcing structure layer thereon allow the touch display device of the present disclosure to meet the design requirement of slim border.

Although the present disclosure has been disclosed above with embodiments, it is not intended to limit the present disclosure. Anyone with ordinary knowledge in the technical field can make some changes and modifications without departing from the spirit and scope of the present disclosure. Therefore, the scope to be protected by the present disclosure shall be determined by the scope of the appended claims.

What is claimed is:

1. A touch display device, comprising:
   a driving substrate, comprising a first portion, a second portion and a bending portion connecting the first portion and the second portion;
   a display medium layer, disposed on the first portion of the driving substrate;
   a conductive film, disposed on the first portion of the driving substrate and located on the display medium layer;
   a touch panel, disposed on the first portion of the driving substrate and located on the conductive film, wherein the display medium layer is shrunk by a gap relative to a side surface of the touch panel to form a space;
   a circuit board, disposed on the second portion of the driving substrate;
   a reinforcing structure layer, disposed on the bending portion of the driving substrate and extending to the first portion to seal the space; and
   a light guide plate, disposed on the first portion of the driving substrate and located on the touch panel, wherein the light guide plate and the display medium layer are disposed on the same side of the driving substrate.

2. The touch display device according to claim 1, further comprising:
   a support plate having a first surface and a second surface opposite to each other and a lateral surface connecting the first surface and the second surface, wherein the first portion of the driving substrate, the display medium layer, the conductive film and the touch panel are located on the first surface, and the second portion of the driving substrate and the circuit board are located on the second surface, and the bending portion of the driving substrate and the reinforcing structure layer are located beside the lateral surface.

3. The touch display device according to claim 2, further comprising:
   a first adhesive layer, disposed between the first surface of the support plate and the first portion of the driving substrate, wherein the first adhesive layer directly contacts the first portion of the driving substrate;
   a protective layer, disposed on the first adhesive layer; and
   a second adhesive layer, disposed on the protective layer, wherein the second adhesive layer directly contacts the protective layer and the first surface of the support plate.

4. The touch display device according claim 2, further comprising:
   a double-sided adhesive layer, which is directly disposed between the second surface of the support plate and the circuit board.

5. The touch display device according to claim 2, further comprising:
   a first adhesive layer, disposed between the second surface of the support plate and the second portion of the driving substrate, wherein the first adhesive layer directly contacts the second surface of the support plate;
   a protective layer, disposed on the first adhesive layer; and
   a second adhesive layer, disposed on the protective layer, wherein the second adhesive layer directly contacts the protective layer and the second portion of the driving substrate.

6. The touch display device according to claim 1, further comprising:
   an adhesive layer, disposed between the touch panel and the conductive film.

7. The touch display device according to claim 1, further comprising:
   a cover plate, disposed on the first portion of the driving substrate and located on the light guide plate.

8. The touch display device according to claim 7, further comprising:
   a first adhesive layer, disposed between the touch panel and the light guide plate; and
   a second adhesive layer, disposed between the light guide plate and the cover plate.

9. The touch display device according to claim 1, further comprising:
   an integrated circuit, disposed on the second portion of the driving substrate, wherein the reinforcing structure layer extends to the second portion and is connected to the integrated circuit.

10. The touch display device according to claim 1, wherein the reinforcing structure layer further extends to cover a side surface of the conductive film.

* * * * *